United States Patent
Uematsu et al.

(10) Patent No.: US 7,069,808 B2
(45) Date of Patent: Jul. 4, 2006

(54) LINE LAYING STRUCTURE FOR ROBOT WRIST

(75) Inventors: Masaaki Uematsu, Kohu (JP);
Kuniyasu Matsumoto, Yamanashi (JP);
Hiroshi Nakagawa, Yamanashi (JP);
Masahiro Morioka, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 282 days.

(21) Appl. No.: 10/401,778

(22) Filed: Mar. 31, 2003

(65) Prior Publication Data
US 2003/0192390 A1    Oct. 16, 2003

(30) Foreign Application Priority Data
Apr. 10, 2002 (JP) .............................. 2002-108162

(51) Int. Cl.
*B25J 17/02* (2006.01)

(52) U.S. Cl. ...................... 74/490.02; 414/918; 901/29

(58) Field of Classification Search ............. 74/490.02, 74/490.05, 490.6; 414/918; 901/29
See application file for complete search history.

(56) References Cited

U.S. PATENT DOCUMENTS

| | | | |
|---|---|---|---|
| 4,529,352 A * | 7/1985 | Suzuki et al. ................ | 414/680 |
| 4,589,816 A * | 5/1986 | Eberle et al. ................ | 414/680 |
| 4,659,279 A * | 4/1987 | Akeel et al. ................. | 414/680 |
| 4,703,668 A | 11/1987 | Peter | |
| 4,705,243 A * | 11/1987 | Hartmann et al. ............ | 248/51 |
| 4,767,257 A * | 8/1988 | Kato ........................ | 414/744.5 |
| 4,830,569 A * | 5/1989 | Jannborg ................... | 414/729 |
| 4,969,795 A * | 11/1990 | Toyoda et al. ............ | 414/744.2 |

(Continued)

FOREIGN PATENT DOCUMENTS

EP    0873826 A2    10/1998

(Continued)

OTHER PUBLICATIONS

European Search Report for Corresponding application No. EP 03252179 dated Aug. 5, 2003.

(Continued)

*Primary Examiner*—William C. Joyce
(74) *Attorney, Agent, or Firm*—Staas & Halsey LLP

(57) ABSTRACT

A line laying structure for a wrist of a robot capable of enhancing durability of lines of cables/pipes for flowing electricity, air, water, etc. to an end effector attached to the wrist, and reducing a restriction of angle of rotation of a wrist axis by rotation of the other wrist axes. First, second and third wrist elements of the wrist are rotatable around fist, second and third axes, respectively. The first wrist element is fixed to a distal end of a forearm of the robot, to be rotated on a mounting base with the forearm as a unit. The lines are clamped on the mounting base by a line retainer and laid inside the forearm and clamped at a distal end of the forearm inside and outside thereof by line retainers. The lines are then clamped by line retainers provided on the second wrist element and introduced to the third wrist element. Then, the lines are clamped by the line retainer provided on the third wrist element and drawn outside thereof to be connected with the end effector. Only limited sections S1–S3 of the lines between the line retainers are subjected to bending, twisting and translation by the rotation of the wrist elements and the other sections of the lines are not influence by the rotation of the wrist elements, to enhance durability of the lines.

10 Claims, 3 Drawing Sheets

U.S. PATENT DOCUMENTS

| | | | | |
|---|---|---|---|---|
| 5,549,016 A | * | 8/1996 | Nakako et al. | 74/490.02 |
| 5,694,813 A | * | 12/1997 | McLaughlan | 74/490.02 |
| 5,893,490 A | * | 4/1999 | Gnyp | 222/526 |
| 6,250,174 B1 | * | 6/2001 | Terada et al. | 74/490.02 |
| 6,288,512 B1 | * | 9/2001 | Berninger et al. | 318/568.1 |
| 6,431,018 B1 | * | 8/2002 | Okada et al. | 74/490.02 |
| 6,530,742 B1 | * | 3/2003 | Trinler et al. | 414/718 |
| 6,644,602 B1 | * | 11/2003 | Lundstrom et al. | 248/51 |
| 6,684,731 B1 | * | 2/2004 | Karlinger | 74/490.02 |
| 5,232,330 A | * | 8/1993 | Rae et al. | 414/686 |
| 5,267,483 A | * | 12/1993 | Torii et al. | 74/490.01 |
| 6,696,810 B1 | * | 2/2004 | Uematsu et al. | 318/568.21 |

FOREIGN PATENT DOCUMENTS

| | | |
|---|---|---|
| JP | 08-197482 | 8/1996 |
| JP | 10-249784 | 9/1998 |
| JP | 10-329079 | 12/1998 |
| JP | 2000-334689 | 12/2000 |
| JP | 2001-150382 | 6/2001 |
| JP | 2001-310289 | 11/2001 |

OTHER PUBLICATIONS

Notice of Grounds of Rejection for corresponding Application No. 2002-108162 mailed Aug. 17, 2004.

Translation of Notice of Grounds of Rejection for corresponding Application No. 2002-1-8162 mailed Aug. 17, 20004.

* cited by examiner

LINE LAYING STRUCTURE FOR ROBOT WRIST

BACKGROUND OF THE INVENTION

1. Field of the Invention

The present invention relates to a wrist of a robot, and in particular to laying structure of lines such as cables and pipes for supplying electric power and fluid such as air and water or discharging fluid to or from an end effector such as a hand and a tool to be attached to the wrist of the robot.

2. Description of Related Art

An end effector such as a hand and a gun as a tool is attached to a wrist of a robot provided at a distal end of an arm for carrying out various operations. Lines of cables/pipes for flowing air, liquid such as water and electricity to the end effector for an operation thereof are arranged through the arm. Since the arm and wrist of the robot perform complex motions, the lines may interfere with other components or peripheral equipments of the robot to lower durability of the lines. There is known a technique of laying lines of cables/pipes inside the wrist or arm of the robot from Japanese Patent Publication No. 2000-334689 and Japanese Patent Publication No. Hei-10-329079. Further, a technique of arranging guiding means for guiding the lines of cables/pipes is known from Japanese Patent Publication No. 2001-150382.

Irrespective of laying location of the lines inside or outside of the arm or wrist of the robot, the lines are subjected to bending, twisting and translation with the complex motion of the arm and wrist of the robot.

In general, the wrist of the robot has three joints for allowing three degrees of freedom around three different axes. Each of the joints is provided with a wrist element rotatable around one of the three axes independently of the other axes. Therefore, when a first wrist element as a base of the wrist with respect to the arm is rotated around the first axis, for instance, the second and third wrist elements connected to the first wrist element and also the end effector attached to the third wrist element are rotated, to cause bending, twisting and translation of the lines entirely from the arm to the end effector. Similarly, when the second wrist element or the third wrist element is rotated, the lines are influenced by the rotation of the wrist element.

Thus, the entire lines of cables/pipes through the arm to the end effector are influenced by rotations of the respective wrist elements at the joints to make bending, twisting and translation.

Further, when the three wrist elements are rotated simultaneously around the respective axes, a specific section of the lines is subjected to a complex motion of bending, twisting and translation by the complex motion of the three wrist elements to make it difficult to obtain a predetermined durability of the lines. Also, there is a problem of restriction of angle of rotation of the wrist element in dependence of angular positions of the other wrist elements.

SUMMARY OF THE INVENTION

An object of the present invention is enhancing durability of lines of cables and/or pipes laid through an arm of a robot for flowing electricity, air, fluid, etc. to an end effector such as a hand and a gun to be attached to the wrist, by restricting bending, twisting and translation of the lines caused by composite motion of a wrist, as well as reducing a restriction of an angle of rotational motion of one axis by rotational motion of the other axes.

Another object of the present invention is to solve a problem of lowering of durability of the lines by interference of the lines with other components or peripheral equipments of the robot.

The present invention provides a line laying structure for laying lines of cables and/or pipes through an arm of a robot to an end effector to be attached to a distal end of a wrist including at least two joints each having a first member and a second member rotatable relatively to each other. According to an aspect of the present invention, the line laying structure comprises a first line retainer provided at the first member of at least one of the joints for retaining the lines on the first member, and a second line retainer provided at the second member of the at least one of the joints for retaining the lines on the second member, so that motion of the lines caused by relative rotation of the first member and the second member is absorbed in a section between the first line retainer and the second line retainer and not transmitted to other sections of the lines.

The arm may be supported on a mounting base rotatably around a first axis of a longitudinal axis of the arm. The wrist may includes a first wrist element fixed to a distal end of the arm, a second wrist element supported on the first wrist element rotatably around a second axis, and a third wrist element supported on the second wrist element rotatably around a third axis. In this case, the first line retainer may be provided at the arm or the first wrist element for retaining the lines on the arm or the first wrist element, and a second line retainer may be provided at the second wrist element for retaining the lines on the second wrist element. Further, the line laying structure may comprise a third line retainer provided at the mounting base for retaining the lines on the mounting base, and a fourth line retainer provided at a distal end of the arm or the first wrist element for retaining the lines at the distal end of the arm or the first wrist element.

Alternatively, the arm may be fixed to a mounting base. In this case, the first wrist element of the wrist is supported at a distal end of the arm rotatably around a first axis. The first line retainer may be provided at the first wrist element for retaining the lines on the first wrist element, and the second line retainer may be provided at the second wrist element for retaining the lines on the second wrist element. Further, the line laying structure may comprise a third line retainer provided at the mounting base or the arm for retaining the lines on the mounting base or the arm, and a fourth line retainer provided at the first wrist element for retaining the lines at the first wrist element.

A section of the lines closer to the distal end of the wrist laid than said second line retainer provided at said second wrist element, which moves with rotation of the third wrist element around the third axis, may be arranged in a vicinity of a point of intersection of the second axis and the third axis, and may have an approximately U-shape or an approximately J-shape.

According to another aspect of the present invention, a section of the lines from the second wrist element to the third wrist element, which moves with rotation of the third wrist element around the third axis, and a section of the lines from the first wrist element to the second wrist element, which moves with rotation of the second wrist element around the second axis may intersect with a plane perpendicular to the third axis and including the second axis at different positions.

DETAILED DESCRIPTION OF THE PREFERRED EMBODIMENTS

Figure 1:
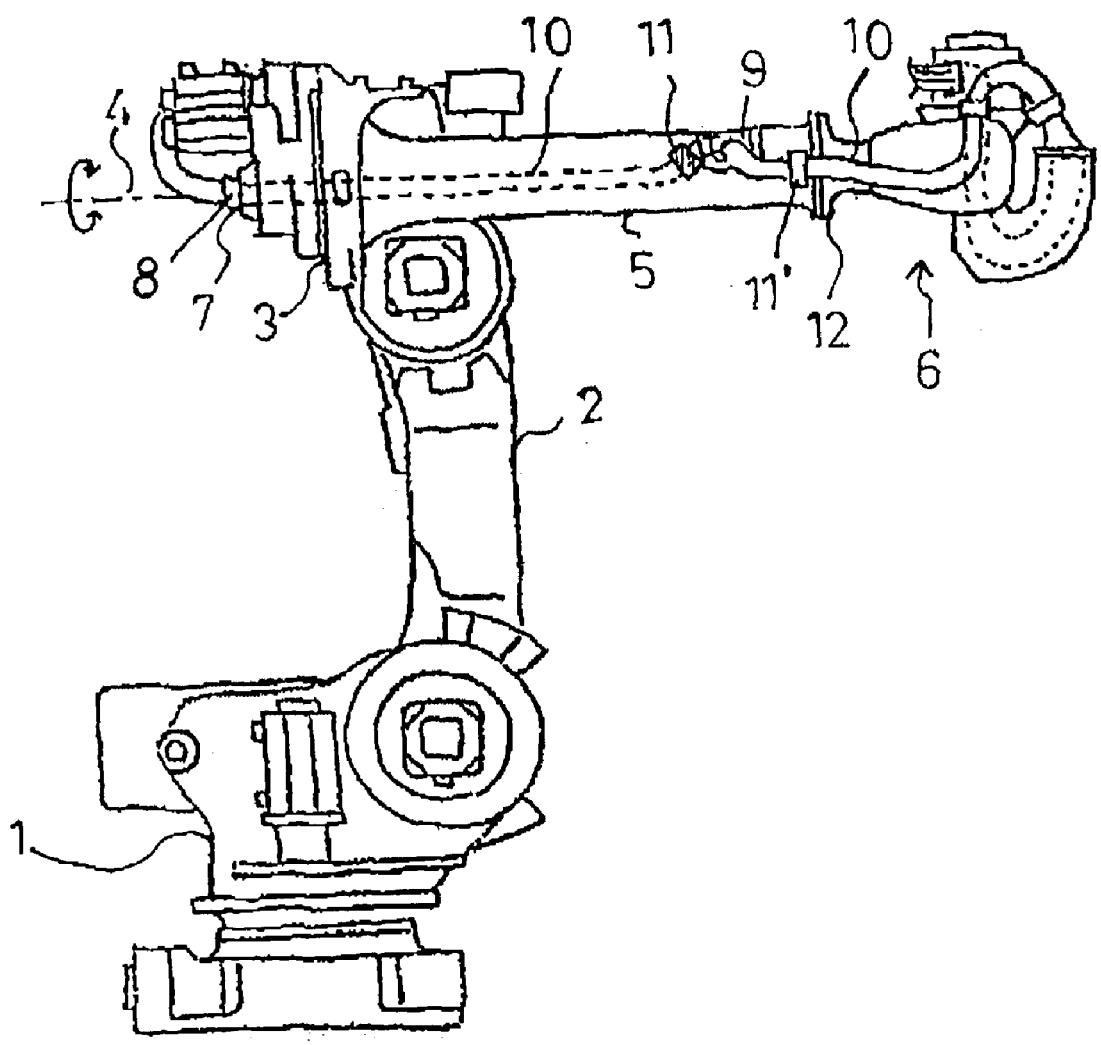
FIG. 1 is a side elevation view of a robot to which the present invention is applied.
Figure 2:
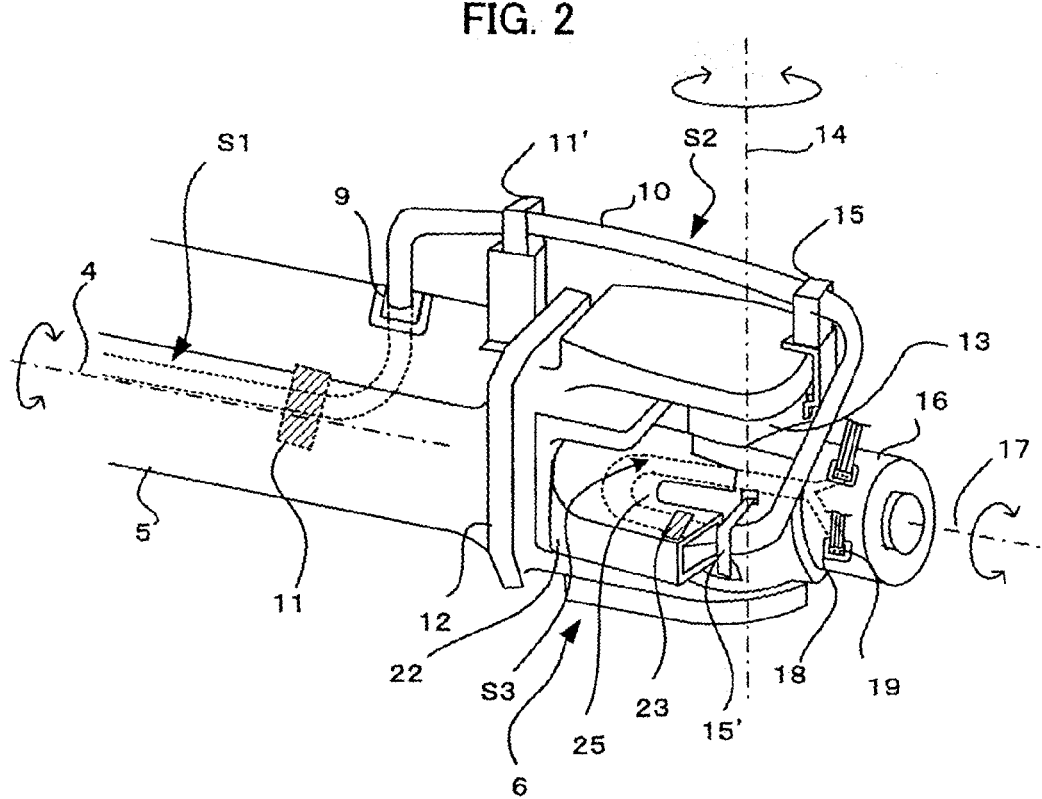
FIG. 2 is a perspective view of a wrist mechanism of the robot to which the present invention is applied.

FIGS. 1 and 2 show an embodiment of a line laying structure in a wrist mechanism of a robot according to the present invention.

Referring to FIG. 1, a mounting base 3 is provided at a distal end of the upper arm 2 which is mounted swingable on a rotatable body 1, and a forearm 5 is supported rotatably on the mounting base 3 around a first axis 4 such that a longitudinal axis of the forearm 5 coincides with the first axis 4. A wrist 6 is mounted on a distal end of the forearm 5 by fixing a first wrist element 12 of the wrist 6 to the distal end of the forearm 5.

Inside the forearm 5, a space for arranging lines 10 of cables/pipes for supplying electricity and fluid to an end effector to be attached to the wrist 6 is formed. The mounting base 3 has an opening 7 communicating with the inner space of the forearm 5 and a line retainer or fixture 8 for clamping the lines 10 in the vicinity of the opening 7. The forearm 5 has an opening 9 communicating with the inner space thereof at the distal end of the forearm 5, and line retainers 11 and 11' for clamping the lines 10 inside and outside of the forearm 5 in the vicinity of the opening 9. Since the first wrist element 12 is fixed to the distal end of the forearm 5 to be united therewith, the line retainers 11 and 11' may be provided at the first wrist element 12.

Referring to FIG. 2 which shows details of the wrist mechanism, the first wrist element 12 is fixed to the distal end of the forearm 5 to be united therewith, so that the first wrist element 12 is rotated with the forearm 5 around the first axis 4 as a unit.

A second wrist element 13 is supported on the first wrist element 12 rotatably around a second axis 14 which intersects with the first axis 4. The second wrist element 13 has two line retainers 15 and 15' for clamping the line 10. A third wrist element 16 is supported at distal end of the second wrist element 13 rotatable around a third axis 17 which intersects with the second axis 14. The third wrist element 16 has a plurality of openings 18 communicating with an inner space of the third wrist element 16 at side faces thereof, and line retainers 19 for clamping the lines 10 in the vicinity of the openings 18. Further, a cover for covering sections of the lines 10 exposed out of the wrist 6 is provided, and FIG. 2 shows only a cover 22 having a line retainer 23 for clamping the lines 10 provided at the second wrist element 13.

The lines 10 laid in the upper arm 2 are introduced from the opening 7 into the inner space of the forearm 5 and drawn outside of the forearm 5 from the opening 9. The lines 10 are retained on the mounting base 3 in the vicinity of the opening 7 by the line retainer 8, and clamped by the line retainers 11 and 11' inside and outside of the opening 9 to be retained on the forearm 5. Then, the lines 10 are laid outside the first wrist element 12 and the second wrist element 13 and turned by the line retainers 15 and 15' provided on the second wrist element 13. Then, the lines 10 are clamped by the line retainer 23 in the cover 22 provided on the second wrist element 13, and bent in an approximately U- or J-shape and laid in a space 25 in the vicinity of a point of intersection of the second axis 14 and the third axis 17. Then the lines 10 are introduced into the third wrist element 16 and drawn outside to be divided and separated from the openings 18 formed at side faces of the third wrist element 16. The lines 10 are clamped to be fixed by the line retainer 19 provided on the third wrist element 16 in the vicinity of the openings 18. Thus, the lines 10 of cables/pipes for flowing electricity, air, water, etc. drawn outside of the third wrist element 16 are connected to an end effector such as a hand and a gun attached to the third wrist element 16. The relative position of the line retainers 15,15' and 23 provided on the second wrist element 13 is not changed and therefore the intermediate line retainer 15' may be omitted. In this embodiment, however, the line retainer 15' is provided for securely laying the lines 10 along the outer face of the second wrist element 13. The lines 10 may be retained by the line retainers 11' and 15 in a manner that the lines are not completely fixed, to obtain an effect substantially the same as complete fixing of the lines 10. For instance, the lines 10 may not be directly clamped but retained by means of a cable conduit or a cable track, or may retained with a space formed between the lines 10 and the clamping device.

As described, since the lines 10 are clamped by the line retainers 8, 11, 11', 15, 15', 23 and 19 to be successively retained on the respective wrist elements, bending, twisting and translation of the lines 10 occur at only sections between the line retainers which relatively move with the rotation of the wrist elements 12, 13 and 16 (rotation of the fist, second and third joints around respective axes 4, 14 and 17) and are absorbed in these sections, and the motion of these section is not transmitted to the other sections of the lines 10. Thus, the sections other than the section between the line retainers which relatively move with the rotation of the wrist elements are not subjected to the bending, twisting and translation influenced by the rotation of the wrist elements.

When the first wrist element 12 is rotated with the forearm 5 around the first axis 4, the line retainer 8 provided at the mounting base 3 and the line retainer 11 provided at the distal end of the forearm 5 are moved relatively with each other to cause twisting of the lines 10 in a section S1 between the line retainer 8 and the line retainer 11, but the line retainers 11', 15, 15', 23 and 19 which are provided closer to a distal end of the wrist 6 than the line retainer 11 are rotated with the line retainer 11 not to change the relative positions of these retainers. Thus, bending, twisting and translation of the lines 10 do not occur in sections other than the section S1 between the line retainer 8 and the line retainer 11.

Further, when the second wrist element 13 is rotated around the second axis 14, the relative positions of the line retainers 15, 15', 23 and 19 are not changed since the third wrist element 16 is rotated with the rotation of the second wrist element 13, so that only the relative positions of the line retainer 11' on the forearm 5 and the line retainer 15 on the second wrist element 13 are changed to cause bending, twisting and translation of the lines 10 at only the section S2 between the line retainer 11' and the line retainer 15. Similarly, when the third wrist element 16 is rotated around the third axis 17, only a section S3 between the line retainer 19 on the third wrist element 16 and the line retainer 23 on the second wrist element 13 makes bending, twisting and translation, and the sections other than the section S3 is prevented from bending, twisting and translation by the line retainer 23, not to be influenced by the rotation of the third wrist element 16. Thus, the restricted section of the line 10 makes bending, twisting and translation by the rotation of the wrist element, not to influence the other wrist element, so that an angle of rotation of the other wrist element is not restricted by the motion of the lines 10.

Since the section S2 of the lines 10 laying outside the second wrist element 13 and the section S3 of the lines 10 introduced to the third wrist element 16 are arranged in a partially overlapped manner as viewed from a direction of the second axis 14, it is made possible to locate the section S3 in the space 25 in the vicinity of the point of intersection of the second axis 14 and the third axis 17, to enhance laying density of the lines 10 and thus make the wrist device compact. Further, since the part of the lines 10 between the line retainer 19 provided on the third wrist element 16 and the line retainer 23 or the line retainer 15' provided on the second wrist element 13 is turned or folded into an approximately U-shape or J-shape, the laying density of the lines 10 is further enhanced to make the wrist device compact.

Further, the part of the lines 10 in the section S3 located in the space 25 in the vicinity of the point of intersection of the second axis 14 and the third axis 17 stays in the space 25 when the first, second and third wrist elements 12,13 and 16 are respectively rotated, so that the section S3 of the lines 10 does not protrude outside from the wrist 6 not to interfere with the peripheral equipments.

The lines 10 are laid closely in a narrow region in the wrist 6 along the respective wrist elements which are arranged densely in the wrist 6, but laid such that friction by mutual contact is reduced. Particularly, the lines 10 in the section S3 which is closer to the distal end of the wrist 6 than the line retainer 23 or 15' provided on the second wrist element 13 and moves with the rotation of the third wrist element 16 around the third axis 17, and the lines 10 in the section S2 between the line retainer 11' provided on the forearm 5 (the first wrist element 12) and the line retainer 15 provided on the second wrist element 13 intersect with a plane including the second axis 14 and perpendicular to a plane including the second axis 14 and the third axis 17 at different positions. Namely, the section S3 and the section S2 of the lines 10 intersect with a plane perpendicular to the third axis 17 and including the second axis 14 at different positions. Thus, the two sections S2 and S3 are arranged parallel to each other in comparison with an arrangement where the lines 10 are laid in series substantially along a longitudinal direction of the forearm, so that enlargement of size of the wrist 6 is prevented and also abrasion of the lines 10 by the friction by mutual contact thereof is prevented to enhance durability of the lines 10.

The foregoing embodiment relates to a wrist of in-line type in which the first axis 4 and the third axis 17 are arranged on a common plane, however the present invention is applicable to a wrist of offset type in which the first axis 4 and the third axis 17 are arranged on different planes.

Figure 3:
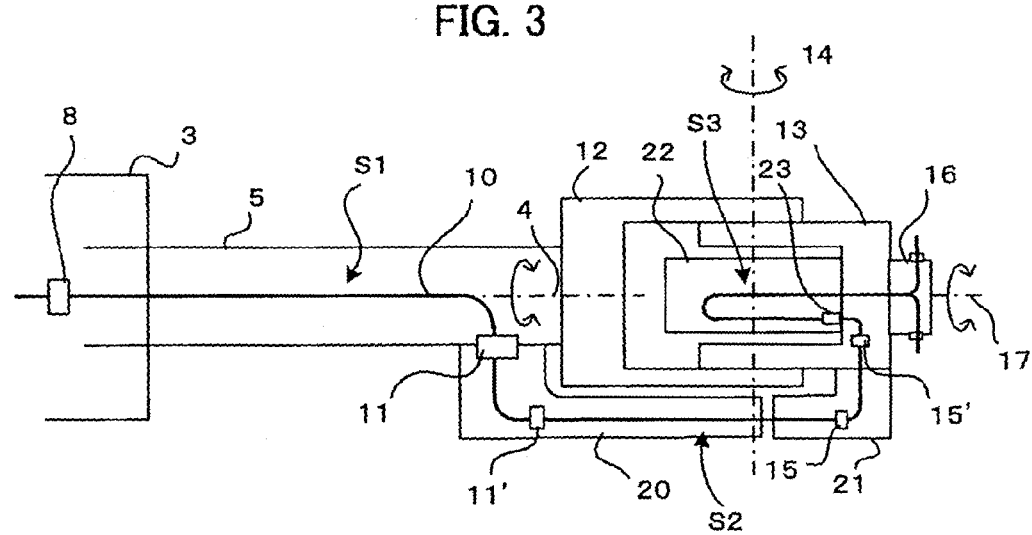
FIG. 3 is a schematic view showing laying structure of lines in the wrist of the robot of in-line type.

FIG. 3 schematically shows a line laying structure in the wrist of in-line type. As shown in FIG. 3, the first axis 4 and the third axis 17 are positioned on substantially the same plane, and covers 20, 21 and 22 for covering sections of the lines 10 exposed from the forearm 5 and the wrist 6 are provided. In particular, a section of the lines 10 laid from the forearm 5 along the outer side face of the first wrist element 12 is covered by the cover 20 provided on the forearm 5 (the first wrist element 12), and a section of the lines 10 adjacent to the above section and laid along the outer side face of the second wrist element 13 is covered by the cover 21 provided on the second wrist element 13, and a section of the lines 10 laid to the third wrist element 16 by being bent in an approximately U- or J-shape is covered by the cover 22 provided on the second wrist element 13.

Figure 4:
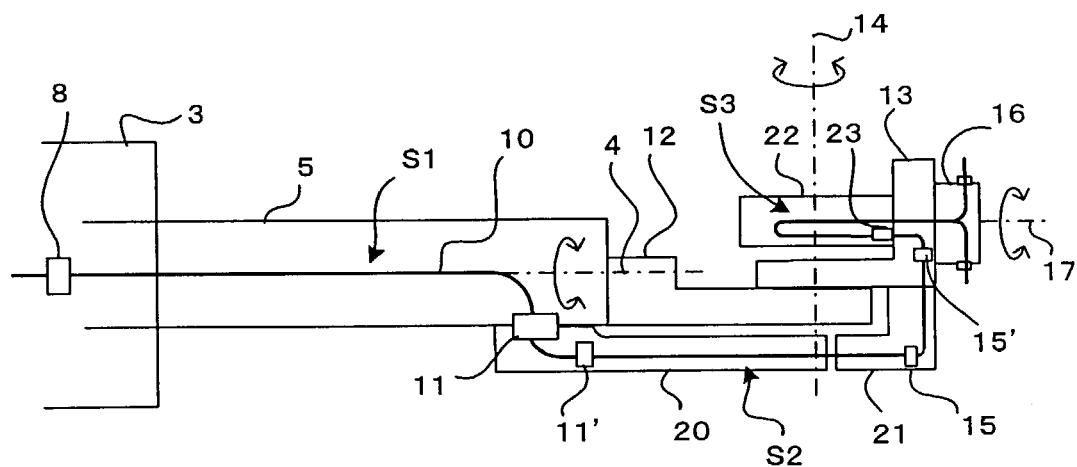
FIG. 4 is a schematic view showing laying structure of lines in a robot wrist of offset type.

FIG. 4 schematically shows a line laying structure in a robot wrist of offset type according to another embodiment of the present invention.

In the wrist of offset type as shown in FIG. 4, the third axis 17 which is a center of rotation of the third wrist element 16 is displaced from the first axis 4 which is a center of rotation of the forearm 5 and the first wrist element 12 in the direction of the second axis 14 which is a center of rotation of the second wrist element 13, so that the first axis 4 and the third axis 17 are offset from each other. The line laying structure applied to the wrist of offset type is the same as the line laying structure as shown in FIG. 2 or FIG. 3 except that the first axis 4 and the third axis 17 are offset.

The lines 10 are clamped by the line retainer 8 provided on the mounting base 3 and laid inside the forearm 5 and drawn outside from the distal end of the forearm 5. Then, the lines 10 are clamped inside and outside of the distal end by the line retainer 11 and 11' and covered by the cover 20 provided at the forearm 5 to be laid outside of the first wrist element 12. The lines 10 are introduced into the cover 21 provided at the second wrist element 13 and clamped by the line retainers 15, 15' provided at the second wrist element 13, and then introduced into the cover 22 provided at the second wrist element 13 and clamped by the line retainer 23 in the cover 22. The lines 10 are then bent in an approximately U- or J-shape to be introduced into the third wrist element 16 and clamped by the line retainers on the third wrist element 16, and drawn outside of the third wrist element 16 from the openings to be divided and separated. The lines 10 drawn outside of the third wrist element 16 are connected to the end effector such as hand and gun attached to the third wrist element 16.

Figure 5:
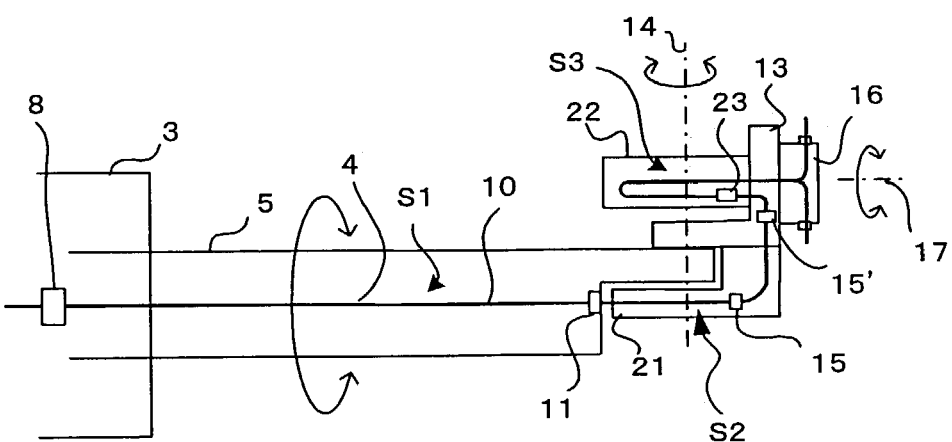
FIG. 5 is a schematic view showing laying structure of lines in another robot wrist of offset type.

FIG. 5 schematically shows an example of a line laying structure applied to another robot wrist of offset type according to the present invention.

In the wrist of offset type as shown in FIG. 5, the second wrist element 13 is supported at the distal end of the forearm 5 as the first wrist element 12 rotatably around the second axis 14, and the third wrist element 16 is supported on the second wrist element 13 rotatably around the third axis 17. The third axis 17 which is a center of rotation of the third wrist element 16 is displaced from the first axis 4 which is a center of rotation of the forearm 5 in the direction of the second axis 14, so that the first axis 4 and the third axis 17 are offset from each other. The forearm 5 is not provided with the cover 20 and the lines 10 drawn from the forearm 5 is covered by the cover 21 provided at the second wrist element 13. Except the above points, the line laying structure applied to another wrist of offset type as shown in FIG. 5 is the same as the line laying structure as shown in FIGS. 3 and 4.

The lines 10 are clamped by the line retainer 8 provided on the mounting base 3 and laid inside the forearm 5 and clamped by the line retainer 11 at the distal end of the forearm 5. The lines 10 are drawn outside of the forearm 5 and introduced into the cover 21 provided at the second wrist element 13 and clamped by the wrist fixtures 15, 15' provided at the second wrist element 13, and then introduced into the cover 22 provided on the second wrist element 13 and clamped by the line retainer 23 in the cover 22. The lines 10 are then bent in an approximately U- or J-shape to be introduced into the third wrist element 16 and clamped by the line retainers on the third wrist element 16, and drawn outside of the third wrist element 16 from the openings to be divided and separated for connection with the end effector.

In the foregoing wrist mechanisms, the first wrist element 12 of the wrist 6 is fixed to be united with the forearm 5. The line laying structure of the present invention is applicable to a wrist mechanism in which the first wrist element 12 of the wrist is supported on the distal end of the forearm 5 rotatably around the first axis 4. In this case, the line retainer 8 is arranged on the forearm 5 and the line retainers 11, 11' are arranged on the first wrist element 12.

Further, the foregoing embodiments are concerned with a wrist having three degrees of freedom around three axes. However, the present invention is applicable to a wrist having two degrees of freedom around two axes and performing a complex motion by rotation around the two axes.

According to the present invention, motion of the lines of cables/pipes laid in the wrist is restricted to particular sections between the wrist elements rotated around their respective axes to perform a complex motion of the wrist, so that the other sections of the lines are not influenced by the complex motion of the wrist, to enhance durability of the lines and reduce restriction of angle of motion of the other axes. Further, since the motion of the lines are restricted, an interference of the lines with the robot body or peripheral equipments is prevented to also enhance the durability of the lines.

Furthermore, since the laying density of the lines is made higher, a wrist of compact size can be provided.

What is claimed is:

1. A line laying structure of laying lines of cables and/or pipes through an arm of a robot supported on a mounting base rotatably around a first axis of a longitudinal axis of the arm to an end effector to be attached to a distal end of a wrist including a first wrist element fixed to a distal end of said arm, a second wrist element supported on said first wrist element rotatably around a second axis, and a third wrist element supported on said second wrist element rotatably around a third axis, said structure comprising:
    a first line retainer provided at said arm or said first wrist element for retaining said lines on said arm or said first wrist element; and
    a second line retainer provided at said second wrist element for retaining said lines on the second wrist element,
    wherein motion of said lines caused by rotation of said second wrist element relative to said first wrist element is absorbed in a section between said first line retainer and said second line retainer and not transmitted to other sections of said lines, and
    wherein a section of said lines which moves with rotation of said third wrist element around said third axis, and a section of said lines which moves with rotation of said second wrist element around said second axis intersect with a plane perpendicular to said third axis and including said second axis at different positions.

2. A line laying structure according to claim 1, further comprising:
    a third line retainer provided at said mounting base for retaining said lines on said mounting base; and
    a fourth line retainer provided at a distal end of said arm or said first wrist element for retaining said lines at the distal end of the arm or the first wrist element.

3. A line laying structure according to claim 1, wherein a section of said lines closer to the distal end of the wrist laid than said second line retainer provided at said second wrist element, which moves with rotation of said third wrist element around said third axis, is arranged in a vicinity of a point of intersection of said second axis and said third axis.

4. A line laying structure according to claim 1, wherein a section of said lines closer to the distal end of the wrist laid than said second line retainer provided at said second wrist element, which moves with rotation of said third wrist element around said third axis, has an approximately U-shape or an approximately J-shape.

5. A line laying structure of laying lines of cables and/or pipes through an arm of a robot fixed to a mounting base to an end effector to be attached to a distal end of a wrist including a first wrist element supported at a distal end of said arm rotatably around a first axis, a second wrist element supported on said first wrist element rotatably around a second axis, and a third wrist element supported on said second wrist element rotatably around a third axis, said structure comprising:
    a first line retainer provided at the first wrist element for retaining said lines on the first wrist element; and
    a second line retainer provided at the second wrist element for retaining said lines on the second wrist element,
    wherein motion of said lines caused by rotation of said second wrist element relative to the first wrist element is absorbed in a section between said first line retainer and said second line retainer and not transmitted to other sections of said lines, and
    wherein a section of said lines which moves with rotation of said third wrist element around said third axis, and a section of said lines which moves with rotation of said second wrist element around said second axis intersect with a plane perpendicular to said third axis and including said second axis at different positions.

6. A line laying structure according to claim 5, further comprising:
    a third line retainer provided at said mounting base or said arm for retaining said lines on said mounting base or said arm; and
    a fourth line retainer provided at said first wrist element for retaining said lines at said first wrist element.

7. A line laying structure according to claim 5, wherein a section of said lines closer to the distal end of the wrist laid than said second line retainer provided at said second wrist element, which moves with rotation of said third wrist element around said third axis, is arranged in a vicinity of a point of intersection of said second axis and said third axis.

8. A line laying structure according to claim 5, wherein a section of said lines closer to the distal end of the wrist laid than said second line retainer provided at said second wrist element, which moves with rotation of said third wrist element around said third axis, has an approximately U-shape or an approximately J-shape.

9. A laying structure for a robot comprising:
    an arm supported on a mounting base rotatably around a first axis of a longitudinal axis of the arm;
    a wrist including a first wrist element fixed to a distal end of said arm, a second wrist element supported on said first wrist element rotatably around a second axis, and a third wrist element supported on said second wrist element rotatably around a third axis;
    lines of cables and/or pipes laid through said arm to an end effector to be attached to a distal end of said wrist;
    wherein a section of said lines which moves with rotation of said third wrist element around said third axis, and a section of said lines which moves with rotation of said second wrist element around said second axis, intersect with a plane perpendicular to said third axis and including said second axis at different positions.

10. A line laying structure for a robot comprising:

an arm fixed to a mounting base;

a wrist including a first wrist element supported at a distal end of said arm rotatably around a first axis, a second wrist element supported on said first wrist element rotatably around a second axis, and a third wrist element supported on said second wrist element rotatably around a third axis;

lines of cables and/or pipes laid through said arm to an end effector to be attached to a distal end of said wrist;

wherein a section of said lines which moves with rotation of said third wrist element around said third axis, and a section of said lines which moves with rotation of said second wrist element around said second axis, intersect with a plane perpendicular to said third axis and including said second axis at different positions.

* * * * *

UNITED STATES PATENT AND TRADEMARK OFFICE
CERTIFICATE OF CORRECTION

PATENT NO. : 7,069,808 B2
APPLICATION NO. : 10/401778
DATED : July 4, 2006
INVENTOR(S) : Masaaki Uematsu et al.

It is certified that error appears in the above-identified patent and that said Letters Patent is hereby corrected as shown below:

On Title Page (item 57)
First Page Column 1 (Abstract), Line 6, change "fist," to --first,--.

Column 4, Line 6, After "Then" insert --,--.

Column 4, Line 33, change "fist," to --first,--.

Signed and Sealed this

Fifth Day of December, 2006

JON W. DUDAS
*Director of the United States Patent and Trademark Office*